United States Patent
Winner et al.

(10) Patent No.: US 6,789,637 B1
(45) Date of Patent: Sep. 14, 2004

(54) DEVICE FOR CONTROLLING DISTANCE

(75) Inventors: Hermann Winner, Bietigheim (DE); Ralph Lauxmann, Korntal-Münchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/070,971

(22) PCT Filed: Aug. 3, 2000

(86) PCT No.: PCT/DE00/02585

§ 371 (c)(1),
(2), (4) Date: Jul. 23, 2002

(87) PCT Pub. No.: WO01/20362

PCT Pub. Date: Mar. 22, 2001

(30) Foreign Application Priority Data

Sep. 11, 1999 (DE) .......................... 199 43 611

(51) Int. Cl.⁷ .............................................. B60K 31/00
(52) U.S. Cl. .................... 180/170; 180/171; 340/436; 340/905
(58) Field of Search ................ 180/167, 169, 180/170, 171; 340/436, 905, 903, 904, 901; 364/426.04

(56) References Cited

U.S. PATENT DOCUMENTS 4,987,357 A * 1/1991 Masaki ...................... 318/587
5,454,442 A * 10/1995 Labuhn et al. .............. 180/169
5,592,146 A * 1/1997 Kover, Jr. .................... 340/468
5,812,321 A * 9/1998 Schierbeek et al. ......... 359/601
5,865,265 A    2/1999 Matsumoto
6,059,686 A * 5/2000 Takahashi .................... 477/47
6,067,031 A * 5/2000 Janky et al. ................. 340/903
6,254,259 B1 * 7/2001 Kobayashi .................. 362/465
6,268,804 B1 * 7/2001 Janky et al. ................. 340/903
6,311,121 B1 * 10/2001 Kuragaki et al. ............. 701/96
6,362,773 B1 * 3/2002 Pochmuller .................. 342/52
6,580,385 B1 * 6/2003 Winner et al. ................ 342/70

FOREIGN PATENT DOCUMENTS

| | | |
|---|---|---|
| DE | 42 09 047 | 8/1993 |
| DE | 44 37 678 | 5/1996 |
| EP | 0 637 525 | 2/1995 |

* cited by examiner

Primary Examiner—Brian L. Johnson
Assistant Examiner—J. Allen Shriver
(74) Attorney, Agent, or Firm—Kenyon & Kenyon

(57) ABSTRACT

The device ascertains a setpoint distance or a setpoint time gap with respect to a vehicle driving ahead as a function of the traveling speed, the distance control taking a minimum distance or a minimum time gap, specifiable by the driver, into consideration when determining the setpoint distance or the setpoint time gap. Since the driver's impression of distance is dependent on the visibility at the moment, in response to poor visibility (bad weather, darkness), the distance control increases the setpoint distance or the setpoint time gap ascertained for normal visibility.

15 Claims, 1 Drawing Sheet

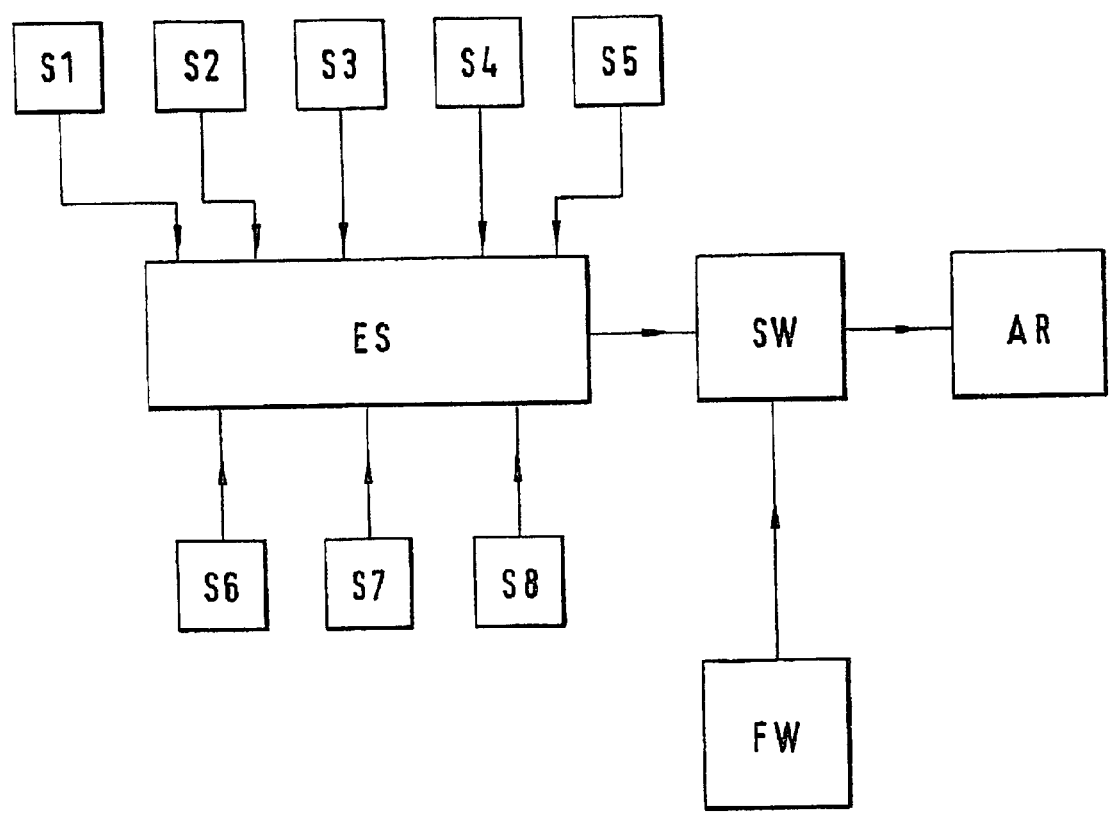

DEVICE FOR CONTROLLING DISTANCE

FIELD OF THE INVENTION

The present invention relates to a device for controlling distance for a motor vehicle, the device observing a setpoint distance or a setpoint time gap with respect to a vehicle driving ahead as a function of the traveling speed, and the distance control taking a minimum distance or a minimum time gap, specifiable by the driver, into consideration when determining the setpoint distance or the setpoint time gap.

BACKGROUND INFORMATION

A distance control for motor vehicles is described in German Patent No. 44 37 678. It describes the distance control system known as an ACC system (adaptive cruise control system). In that case, the distance and/or the relative speed with respect to the motor vehicle driving ahead is usually determined by a measuring device operating according to the radar or laser principle. With this information about the distance or the relative speed, the speed of one's own vehicle is controlled by an intervention in the drive and/or the brake of the vehicle in such a way that the distance to the vehicle driving ahead corresponds to a predefined setpoint distance. Instead of the setpoint distance, the variable equivalent thereto, namely, a setpoint time gap between the two vehicles following one another, can also be regulated.

Usually, the setpoint distance corresponds to a defined speed-dependent safety distance. However, a fixedly defined safety distance or a definitively predefined setpoint time gap is often not compatible with the personal driving style of a driver. Thus, sporty drivers will more likely prefer a smaller distance to the vehicle driving ahead, while a driver having a steadier driving style will want to follow a preceding vehicle at a greater safety distance. In order to take the driver's wish into account, according to German Patent No. 44 37 678, the possibility is given to the driver to set a minimum distance or a minimum time gap desired by him/her via an operating control element. This stipulation by the driver is taken into account during the determination of the setpoint distance or the setpoint time gap by the adaptive cruise control system. According to the related art, when ascertaining the setpoint distance or the setpoint time gap in view of the drivers wish, no differentiation is made as to whether visibility is good or poor.

Given poor visibility, i.e. during bad weather and/or when it is dark, the driver perceives a given distance to a preceding vehicle to be shorter than in the case of normal visibility as prevails during the day and under good weather conditions. Therefore, an object of the present invention is to take the different distance impression of the driver, depending upon whether good or poor visibility prevails, into account when the setpoint distance or the setpoint time gap is determined by the distance control.

SUMMARY OF THE INVENTION

The indicated objective is achieved in that, in response to poor visibility, the distance control increases the setpoint distance or the setpoint time gap ascertained for normal visibility. Namely, the driver then no longer perceives the setpoint distance (setpoint time gap) set by the distance control, taking into account the driver's wish, to be smaller compared to the setpoint distance (setpoint time gap) during good visibility.

Accordingly, to recognize poor visibility, sensors are provided which detect indications of bad weather and/or darkness. Among these are preferably sensors which, for example, detect the visual range, the road condition, the windshield wiper activity, the switching on of fog lights, precipitation (rain, snow, fog), the brightness of the surroundings, the switching on of headlights.

Preferably, the distance control increases the setpoint time gap during poor visibility by 20 to 30% compared to normal visibility.

BRIEF DESCRIPTION OF THE DRAWINGS

The FIGURE shows a block diagram of a distance control for motor vehicles.

DETAILED DESCRIPTION

The distance control system for a motor vehicle, shown in the FIGURE as a block diagram, contains a generally known device, based on the laser or radar principle, for measuring the distance or the relative speed of one's own vehicle compared to a vehicle driving ahead. This device AR regulates the traveling speed of the vehicle by intervention in the engine drive and/or the brake so that the distance or the time gap with respect to the preceding vehicle corresponds to a setpoint distance or a setpoint time gap. The setpoint distance or the setpoint time gap is ascertained in a block SW and supplied to device AR.

In circuit block SW, the setpoint distance is ascertained as a function of the instantaneous speed of the vehicle. The greater the vehicular speed, the greater the setpoint distance must be with respect to a vehicle driving ahead. If one considers the time gap between the two vehicles—that is, the distance between the instant at which the preceding vehicle passes a specific location, and the instant at which one's own vehicle reaches the same location—then this is a constant quantity independent of the traveling speed. The setpoint distance or the setpoint time gap is selected such that, in the event of an extreme braking by the preceding vehicle, sufficient distance or time reserve remains for the rear vehicle for a braking reaction, so that a pile-up does not occur.

The intention is now to take the personal driving style (sporty or reserved) of the driver into account in the stipulation of the setpoint distance or setpoint time gap, as well. Therefore, an operating control element is made available to the driver with which he/she is able to specify a minimum distance or a minimum time gap adapted to his/her driving style. Block FW in the drawing clarifies the stipulation of a minimum distance or a minimum time gap which is considered in block SW when ascertaining the setpoint distance or the setpoint time gap.

It is true for every driver that when visibility is poor, e.g. during bad weather or when it is dark, the driver perceives a given setpoint distance to be shorter than he/she would if visibility were good. In order to counteract this deceptive sensory perception, the setpoint distance or the setpoint time gap is increased in response to poor visibility. The setpoint distance or the setpoint time gap may be raised in one step, or raised adaptively according to the degree of visibility. That is to say, the poorer the visibility, the more sharply the setpoint distance or the setpoint time gap is increased in relation to values of the setpoint distance or the setpoint time gap when the visual range is good. For this reason, a unit ES is provided which recognizes the instantaneous visibility and transmits the information about it to circuit block SW for determining the setpoint distance or the setpoint time gap.

To detect the visibility, a plurality of sensors S1 through S8 are provided, whose output signals are received by unit ES, and it derives information about the visibility by, for example, interconnections and threshold decisions of the individual sensor signals. For example, the group of sensors S1 through S5 detects those conditions which suggest impairment of visibility because of bad weather. Among these conditions are, for example:

the visual range, which may be acquired, for example, by reflection measurements in the vicinity in front of the vehicle;

the road condition, it being detected, e.g. optically or by radar, whether the road is wet or covered with snow;

the windshield wiper activity;

the switching on of fog lights.

Sensors S6 through S8 are preferably of the type which are able to recognize darkness. Suitable for this purpose are sensors which, for example measure the brightness of the surroundings (using photodiodes);

detect the circuit state of the headlights.

As equation (1) conveys, altered setpoint time gap SZ* may be formed by a percentage increase of setpoint time gap SZ as it is calculated for good visibility. In this context, parameter ISW describes the visibility on the basis of the weather; during good weather, parameter ISW is 0, and in bad weather, is 1. Parameter ID describes the visibility on the basis of the brightness; in sunshine, parameter ID is 0, and in darkness, is 1. Factors X1 and Y1 are applicable and lie in the order of magnitude of 10 to 20%.

$$SZ^* = SZ \cdot (1 + X1 \cdot ISW + Y1 \cdot ID) \quad (1)$$

Altered setpoint time gap SZ* may also result according to equation (2) from a constant increase of visual range SZ in response to good visibility.

$$SZ^* = SZ + X2 + ISW + Y2 \cdot ID \quad (2)$$

Factors X2 and Y2 are applicable and lie in an order of magnitude between 0.1 and 0.3 seconds.

Analogous to equations (1) and (2), new setpoint distance SA* may also be formed from a percentage increase of setpoint distance SA in the case of good visibility according to equation (3), or by a constant enlargement of setpoint distance SA according to equation (4). Factors X3 and Y3 in equation (3) are applicable parameters in the order of magnitude of 3 to 5 m/s, and factors X4 and Y4 in equation (4) are applicable parameters in the order of magnitude of 5 to 10 m/s. The instantaneous vehicular speed is designated by v.

$$SA^* = SA(1 + X3 \cdot ISW/v + Y3 \cdot ID/v) \quad (3)$$

$$SA^* = SA + X4 \cdot ISW/v + Y4 \cdot ID/v \quad (4)$$

To counteract the deceptive impression of distance for the driver during poor visibility, it is sufficient if the distance control increases the setpoint time gap during poor visibility by 20 to 30% compared to normal visibility. Altered values SZ* and SA* for the setpoint time gap and the setpoint distance, respectively, are thus rather slight, so that in the event the visibility is not detected accurately, no negative effect results for the distance control.

What is claimed is:

1. A device for controlling distance for a motor vehicle, comprising:

a distance control device for determining a setpoint time gap with respect to a vehicle driving ahead as a function of a traveling speed and of a driver-specified minimum time gap; and at least one sensor for recognizing a poor visibility condition, the at least one sensor including at least one sensor for detecting a visual range in a vicinity of the vehicle using reflection measurement, the at least one sensor including at least one sensor for detecting a road condition and at least one sensor for detecting a level of brightness and adapted to recognize darkness;

wherein, in response to the poor visibility condition, the distance control device increases the setpoint time gap determined for normal visibility, and wherein the driver-specified minimum time gap is modified to account for visibility condition by increasing the driver-specified minimum time gap using a first linear coefficient representing visibility due to weather conditions and a second linear coefficient representing visibility due to brightness.

2. The device according to claim 1, wherein the at least one sensor for detecting a road condition functions one of optically and by radar, the road condition including whether the road is wet or covered with snow.

3. The device according to claim 1, wherein the at least one sensor for detecting a brightness includes at least one photodiode.

4. The device according to claim 1, wherein the distance control device increases the setpoint time gap during the poor visibility condition by 20 to 30% compared to normal visibility.

5. The device according to claim 3, wherein the at least one sensor further includes a detector that detects a circuit state of headlights of the motor vehicle.

6. The device according to claim 1, wherein the first linear coefficient varies between 0 and 1, 0 representing good weather and 1 representing poor weather, and the second coefficient varies between 0 and 1, 0 representing sunshine and 1 representing darkness.

7. The device according to claim 6, wherein the driver-specified minimum time gap is modified according to the following equation:

$$SZ^* = SZ \cdot (1 + X1 \cdot ISW + Y1 \cdot ID),$$

wherein SZ represents the driver-specified minimum time gap, ISW represents the first linear coefficient, ID represents the second linear coefficient and factors X1 and Y1 lie in an order of magnitude of 10 to 20%.

8. The device according to claim 6, wherein the driver-specified minimum time gap is modified according to the following equation:

$$SZ^* = SZ + X2 \cdot ISW + Y2 \cdot ID,$$

wherein SZ represents the driver-specified minimum time gap, ISW represents the first linear coefficient, ID represents the second linear coefficient and factors X1 and Y1 lie in an order of magnitude of 0.1 to 0.3 seconds.

9. The device according to claim 1, wherein the at least one sensor for detecting a road condition operates one of optically and by radar, and the at least one sensor for detecting a brightness includes at least one photodiode.

10. The device according to claim 9, wherein the distance control device increases the setpoint time gap during the poor visibility condition by 20 to 30% compared to normal visibility.

11. The device according to claim 9, wherein the at least one sensor further includes a detector that detects a circuit state of headlights of the motor vehicle.

12. A device for controlling distance for a motor vehicle, comprising:

a distance control device for determining a setpoint time gap with respect to a vehicle driving ahead as a function of a traveling speed and of a driver-specified minimum time gap; and at least one sensor for recognizing a poor visibility condition, the at least one sensor including at least one sensor for detecting a visual range in a vicinity of the vehicle using reflection measurement, the at least one sensor including at least one sensor for detecting a road condition and at least one sensor for detecting a level of brightness and adapted to recognize darkness;

wherein, in response to the poor visibility condition, the distance control device increases the setpoint time gap determined for normal visibility, wherein the at least one sensor for detecting a road condition operates one of optically and by radar, and the at least one sensor for detecting a brightness includes at least one photodiode, and wherein the driver-specified minimum time gap is modified to account for visibility condition by increasing the driver-specified minimum time gap using a first linear coefficient representing visibility due to weather conditions and a second linear coefficient representing visibility due to brightness.

13. The device according to claim 12, wherein the first linear coefficient varies between 0 and 1, 0 representing good weather and 1 representing poor weather, and the second coefficient varies between 0 and 1, 0 representing sunshine and 1 representing darkness.

14. The device according to claim 13, wherein the driver-specified minimum time gap is modified according to the following equation:

$$SZ^* = SZ \cdot (1 + X1 \cdot ISW + Y1 \cdot ID),$$

wherein SZ represents the driver-specified minimum time gap, ISW represents the first linear coefficient, ID represents the second linear coefficient and factors X1 and Y1 lie in an order of magnitude of 10 to 20%.

15. The device according to claim 13, wherein the driver-specified minimum time gap is modified according to the following equation:

$$SZ^* = SZ + X2 \cdot ISW + Y2 \cdot ID,$$

wherein SZ represents the driver-specified minimum time gap, ISW represents the first linear coefficient, ID represents the second linear coefficient and factors X1 and Y1 lie in an order of magnitude of 0.1 to 0.3 seconds.

* * * * *

UNITED STATES PATENT AND TRADEMARK OFFICE
CERTIFICATE OF CORRECTION

PATENT NO. : 6,789,637 B1
DATED : September 14, 2004
INVENTOR(S) : Hermann Winner et al.

It is certified that error appears in the above-identified patent and that said Letters Patent is hereby corrected as shown below:

Column 2,
Line 18, change "The distance control system" to -- The distance control system (adaptive cruise control system) --.

Signed and Sealed this

Twenty-ninth Day of November, 2005

JON W. DUDAS
*Director of the United States Patent and Trademark Office*